(12) United States Patent
Panda et al.

(10) Patent No.: US 8,783,948 B2
(45) Date of Patent: Jul. 22, 2014

(54) FLEXIBLE TEMPERATURE SENSOR AND SENSOR ARRAY

(75) Inventors: Siddhartha Panda, Kanpur (IN); Hakeem Abrar Ahmed, Srinagar (IN)

(73) Assignee: Indian Institute of Technology Kanpur, Uttar Pradesh (IN)

( * ) Notice: Subject to any disclaimer, the term of this patent is extended or adjusted under 35 U.S.C. 154(b) by 143 days.

(21) Appl. No.: 13/142,843

(22) PCT Filed: Nov. 9, 2010

(86) PCT No.: PCT/IB2010/055082
§ 371 (c)(1),
(2), (4) Date: Jun. 29, 2011

(87) PCT Pub. No.: WO2012/001465
PCT Pub. Date: Jan. 5, 2012

(65) Prior Publication Data
US 2012/0263209 A1 Oct. 18, 2012

(30) Foreign Application Priority Data
Jun. 29, 2010 (IN) .............................. 1520/DEL/2010

(51) Int. Cl.
*G01K 7/00* (2006.01)
(52) U.S. Cl.
USPC ....................................................... 374/163
(58) Field of Classification Search
USPC ....................................................... 374/163
See application file for complete search history.

(56) References Cited

U.S. PATENT DOCUMENTS

| 3,211,702 | A | * | 10/1965 | Van Gijzen ................... 528/271 |
| 5,311,754 | A | | 5/1994 | Itgenshorst et al. |
| 7,463,040 | B2 | | 12/2008 | Qi et al. |
| 7,719,404 | B2 | * | 5/2010 | Makela et al. ................ 338/200 |
| 2005/0061681 | A1 | * | 3/2005 | Lim et al. ...................... 205/414 |
| 2006/0203882 | A1 | * | 9/2006 | Makela et al. ................ 374/161 |

FOREIGN PATENT DOCUMENTS

| JP | 03211702 A | * | 9/1991 |
| JP | 3211702 A | | 9/1991 |
| JP | 06084587 A | * | 3/1994 |
| JP | 11001063 A | * | 1/1999 |
| JP | 2004335730 | | 11/2004 |

(Continued)

OTHER PUBLICATIONS

G.E. Asturias, A.G. MacDiardmid, The Oxidation of State of Emeraldine Base, Synthetic Metals, 29 (1989) 157-162.

(Continued)

*Primary Examiner* — Lisa Caputo
*Assistant Examiner* — Jamel Williams
(74) *Attorney, Agent, or Firm* — Knobbe Martens Olson & Bear LLP

(57) ABSTRACT

Techniques described herein generally relate to methods of manufacturing devices and systems including devices including a substrate with a surface, a conductive polymer film arranged on the surface of the substrate, wherein the conductive polymer film has one or more temperature reactive characteristics, and a pair of electrodes coupled to the polymer film, wherein the pair of electrodes are configured to communicate electrical signals to the conductive polymer film effective to measure the one or more temperature reactive characteristics. The conductive polymer film may be arranged on the surface of the substrate such that a thickness and dopant ratio of the conductive polymer film on the substrate is configurable.

23 Claims, 11 Drawing Sheets

(56) References Cited

FOREIGN PATENT DOCUMENTS

| JP | 2004335730 A | * | 11/2004 |
| JP | 2008130939 | | 6/2008 |
| JP | 2008130939 A | * | 6/2008 |
| WO | WO 0123659 A1 | * | 4/2001 |

OTHER PUBLICATIONS

P.W. Barth, S.L. Bernard, J.B. Angell, Flexible Circuit and Sensor Arrays Fabricated by Monolithic Silicon Technology, IEEE Transactions on Electron Devices, ED-32 (1985) 1202-1205.

J. Bhadra, D. Sarkar, Self-assembled polyaniline nanorods synthesized by facile route of dispersion polymerization, Materials Letters, 63 (2009) 69-71.

T.L.A. Campos, D.F. Kersting, C.A. Ferreira, Chemical synthesis of polyaniline using sulphanilic acid as dopant agent into the reactional medium, Surface and Coatings Technology, 122 (1999) 3-5.

Y. Cao, P. Smith, A.J. Heeger, Counter-ion induced processibility of conducting polyaniline and of conducting polyblends of polyaniline in bulk polymers, Synthetic Metals, 48 (1992) 91-97.

Y. Cao, P. Smith, A.J. Heeger, Counter-ion Induced Processibility of Conducting Polyaniline, Synthetic Metals, (1993) 3514-3519.

S. Ebrahim, A.-H. Kashyout, M. Soliman, Ac and Dc conductivities of polyaniline/poly vinyl formal blend films, Current Applied Physics, 9 (2009) 448-454.

J. Huang, M. Wan, Temperature and pressure dependence of conductivity of polyaniline synthesized by in situ doping polymerization in the presence of organic function acid as dopants, Solid State Communications, 108 (1998) 255-259.

J. Jin, Q. Wang, M.A. Haque, Doping dependence of electrical and thermal conductivity of nanoscale polyaniline thin films, J. Phys. D: Appl. Phys. , 43 (2010) 205-302.

J. Jin, Q. Wang, M.A. Haque, Length-scale effects on electrical and thermal transport in polyaniline thin films, Organic Electronics, 11 (2010) 29-35.

S. Kim, J.M. Ko, I.J. Chung, Electrical Conductivity Change of Polyaniline-Dodecyl Benzene Sulfonic Acid Complex with Temperature, Polymers for Advanced Technologies, 7 (1996) 599-603.

S. Kivelson, A.J. Heeger, Intrinsic conductivity of conducting polymers, Synthetic Metals, 22 (1988) 371-384.

C.-T. Kuo, C.-H. Chen, Characterization of polyaniline doped with diphenyl phosphate, Synthetic Metals 99 (1999) 163-167.

G.B. Lee, F.C. Huang, C.Y. Lee, J.J. Miau, A New fabrication process for a flexible skin with temperature sensor array and its applications, Acta Mechanica Sinica/Lixue Xuebao, 20 (2004) 140-145.

Y. Long, Z. Chen, N. Wang, Z. Zhang, M. Wan, Resistivity study of polyaniline doped with protonic acids, Physica B 325 (2003) 208-213.

X. Lu, H.Y. Ng, J. Xu, C. He, Electrical Conductivity of Polyaniline-dodecylbenzene sulphonic acid complex: thermal degradation and its mechanism, Synthetic Metals, (2002) 167-178.

J.G.Masters, Y.Sun, A.G.Macdiarmid, Polyaniline: Allowed Oxidation States, Synthetic Metals, 41-43 (1991) 715-718.

Minco, "Sensors & Instruments Solutions Guide" (2010).

Y. Moser, M.AM. Gijs, Miniaturized flexible temperature sensor, Journal of Microelectromechanical Systems, 16 (2007) 1349-1354.

N.J. Pinto, P.L. Carrión, A.M. Ayala, M. Ortiz-Marciales, Temperature dependence of the resistance of self-assembled polyaniline nanotubes doped with 2-acrylamido-2-methyl-1-propanesulfonic acid, Synthetic Metals, 148 (2005) 271-274.

T. Prakash, S.A.K.N. Dass, K.P. Nazeer, Thermal sensor properties of PANI(EB)—CSAX (X=0.4±0.1 mol) polymer thin films, Bull. Mater. Sci., Indian Academy of Sciences, 25 (2002) 521-526.

S. Saravanan, C. Joseph Mathai, M.R. Anantharaman, S. Venkatachalam, P.V. Prabhakaran, Investigations on the electrical and structural properties of polyaniline doped with camphor sulphonic acid, Journal of Physics and Chemistry of Solids, 67 (2006) 1496-1501.

J. Stejskal, R.G. Gilbert, Polyaniline. Preparation of a Conducting Polymer, Pure and Applied Chemistry 74 (2002) 857-867.

Written Opinion of the International Searching Authority mailed Jan. 28, 2011, in PCT/IB2010/055082, filed Nov. 9, 2010.

Macdiarmid, A.G., and Epstein, A.J., "The concept of secondary doping as applied to polyaniline," Synthetic Metals, vol. 65, pp. 103-116 (1994).

* cited by examiner

FLEXIBLE TEMPERATURE SENSOR AND SENSOR ARRAY

BACKGROUND

Unless otherwise indicated herein, the materials described in this section are not prior art to the claims in this application and are not admitted to be prior art by inclusion in this section.

Measurement of the temperature distribution on curved surfaces is performed in several applications and devices including electronic appliances, aerodynamic systems, automobiles, and medical systems and devices. Such measurement may be achieved with a flexible temperature sensor or sensor array, which may use silicon or metal strips as sensing elements on a flexible substrate, for example, a polyimide substrate.

Use of silicon as a sensing element entails the use of several expensive processing steps associated with typical silicon processing. Also, such silicon processing may suffer from known issues such as silicon etchants that may have a deleterious effect on the polymer substrates. Accordingly, for successful processing, further expensive processing steps may be used including, e.g., encapsulation, a process of sandwiching the sensing element with a protective layer resistant to environment. The protective layer protects the sensing element from moisture, oxidation, etc. which may damage the sensing device/element.

Similarly, using metal strips as sensing elements on a substrate also entails expensive processing and material. Apart from these cost issues, metal sensing elements may not be reliable because of the mismatch of thermal expansion between the metal sensing element and the polymer substrate on which the sensing element is deposited. Metal sensing elements have also been known to have a restricted operational temperature range and lack tunability for sensitivity.

SUMMARY

Some embodiments relate to a device configured, for example, as a temperature sensor. Some example devices include a substrate having a surface, a conductive polymer film arranged on the surface of the substrate, and a pair of electrodes coupled to the polymer film. The conductive polymer film may have one or more temperature reactive characteristics, and the pair of electrodes may be configured to communicate electrical signals to the conductive polymer film which may be effective to measure the one or more temperature reactive characteristics of the conductive polymer film.

Some embodiments relate to a method for manufacturing device, for example, a temperature sensing device. The method may include providing a substrate; depositing a conductive polymer film on the substrate, and connecting a pair of electrodes to the conductive polymer film. In some examples, depositing may include controlling a thickness of the conductive polymer film on the substrate, and selecting a ratio of the conductive polymer to a dopant used to dope the conductive polymer. The conductive polymer film may have one or more temperature reactive characteristics, and the pair of electrodes may be configured to communicate electrical signals to the conductive polymer film which may be effective to measure the one or more temperature reactive characteristics of the conductive polymer film.

Some embodiments relate to a system including an object, and a sensing device arranged to operatively contact the object to sense a thermal state of the object. The sensing device may include a substrate including a surface, a conductive polymer film arranged on the surface of the substrate, wherein the conductive polymer film may have one or more temperature reactive characteristics, and a pair of electrodes coupled to the polymer film. The pair of electrodes may be configured to communicate electrical signals to the conductive polymer film effective to measure the one or more temperature reactive characteristics, such that the thermal state of the object is determined.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Features of the invention are shown in the drawings, in which like reference numerals designate like elements.

DETAILED DESCRIPTION

Figure 1:
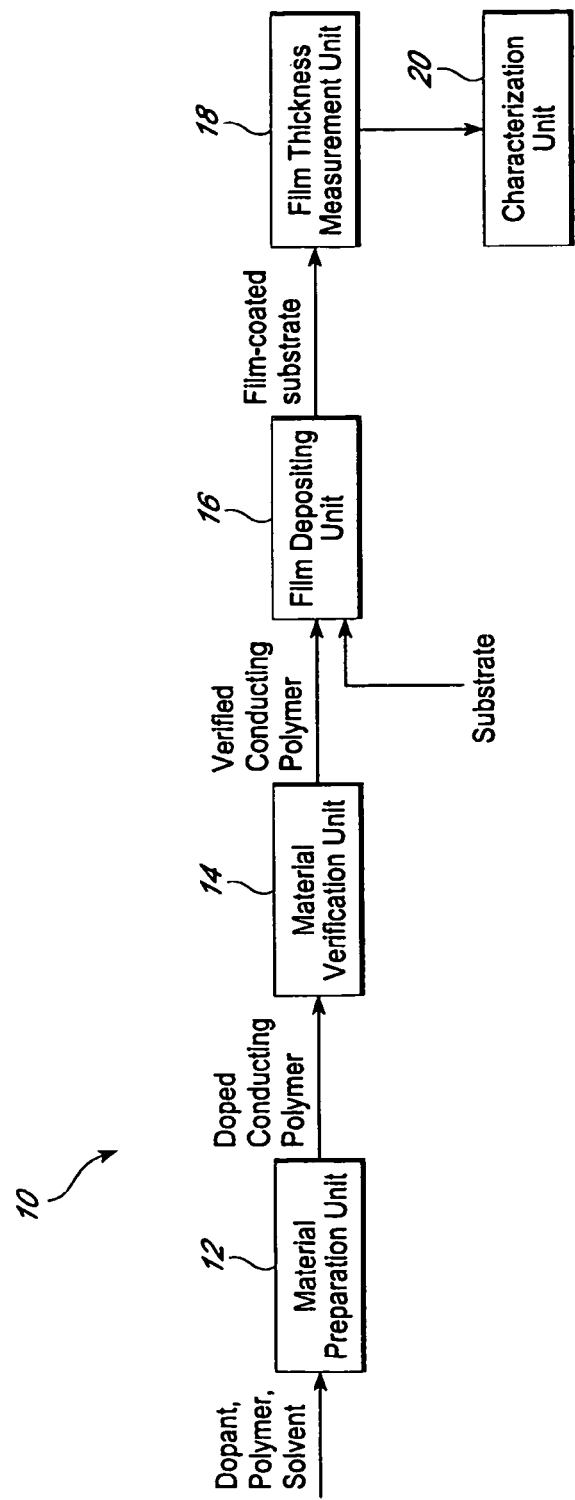
FIG. 1 is a schematic diagram of system of manufacturing a device according to some embodiments.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, devices, and systems related to flexible temperature sensors and manufacturing thereof.

Briefly stated, techniques described herein generally relate to methods of manufacturing devices and systems including devices including a substrate with a surface, a conductive polymer film arranged on the surface of the substrate, wherein the conductive polymer film has one or more temperature reactive characteristics, and a pair of electrodes coupled to the polymer film, wherein the pair of electrodes are configured to communicate electrical signals to the conductive polymer film effective to measure the one or more temperature reactive characteristics. The conductive polymer film may be arranged on the surface of the substrate such that a thickness and dopant ratio of the conductive polymer film on the substrate is configurable.

Flexible temperature sensors having silicon or metal sensors may be unreliable, expensive to manufacture and have low sensitivity. Embodiments described herein include a low-cost flexible temperature sensing device and device array that include conducting polymers as the sensing element. These temperature-sensing elements may be manufactured by simple, low cost and environment friendly processes including, but not limited to, spin coating and polymer printing. In some embodiments, these temperature sensing elements are configured to have a wide tunable sensitivity range. The sensitivity may be tuned by configuring the thickness of the conducting polymer and/or selecting a ratio the conducting polymer to a dopant used therewith. Apart from being used as discrete temperature sensing devices, these devices may also be integrated into other flexible electronic devices such as solar cells and light emitting diodes.

Some embodiments relate to a device configured as a temperature sensor. Some example devices include a substrate having a surface, a conductive polymer film arranged on the surface of the substrate, and a pair of electrodes coupled to the polymer film. The conductive polymer film may have one or more temperature reactive characteristics, and the pair of electrodes may be configured to communicate electrical signals to (or from) the conductive polymer film effective to measure the one or more temperature reactive characteristics of the conductive polymer film. Some embodiments include doping the conductive polymer with a dopant, wherein the ratio of the conductive polymer to the dopant may be about 1, about 0.5, or about 0.3 or in a range between about 0.3 to about 1.

In some embodiments, the conductive polymer film is deposited on a flexible substrate using a technique selected from the group consisting of spin coating, polymer printing, spray coating and dip coating. These example devices may be configured to have a sensitivity value in the range of about 3 $\Omega/°C$ to about 130 $\Omega/°C$. In some embodiments, a thickness of the conductive polymer film on the substrate is configurable from about 10 nm to about 150 nm. The substrate may be, for example, polyethylene terephthalate (PET) substrate, or polyimide substrate. The conductive polymer may be selected from the group consisting of polyaniline, polypyrrole, polythiophene, poly(p-phenylene), poly(p-phenylenevinylene), poly(2,5-thienylenevinylene) and poly(3,4-ethylenedioxythiophene). Further, the dopant may be selected such that the combination of the conductive polymer and dopant is soluble in a solvent, and from the group consisting of camphor sulfonic acid (CSA) and dodecyl benzene sulfonic acid (DBSA), 2-Acrylamido-2-methylpropane sulfonic acid (AMPSA), hydrochloric acid, sulfuric acid and phosphoric acid.

Some embodiments relate to a method for manufacturing a temperature sensing device, the method including providing a substrate; depositing a conductive polymer film on the substrate and connecting a pair of electrodes to the conductive polymer film. In some examples, depositing may include controlling a thickness of the conductive polymer film on the substrate, and selecting a ratio of the conductive polymer to a dopant used to dope the conductive polymer. The conductive polymer film may have one or more temperature reactive characteristics, and the pair of electrodes may be configured to communicate electrical signals to the conductive polymer film which may be effective to measure the one or more temperature reactive characteristics of the conductive polymer film. In some examples, controlling the thickness of the conductive polymer film on the substrate comprise configuring the thickness from about 10 nm to about 150 nm. The ratio of the conductive polymer to the dopant may be about 1, about 0.5, or about 0.3. Accordingly, a sensitivity of the manufactured device may be tuned in the range of about 3 $\Omega/°C$ to about 130 $\Omega/°C$.

In some embodiments, depositing the conductive polymer film on the substrate comprises using a technique selected from the group consisting of spin coating the polymer film on the substrate, printing the polymer film on the substrate, spray coating the polymer film on the substrate and dip coating the polymer film on the substrate. The substrate may be flexible and may include a polyethylene terephthalate (PET) substrate or polyimide substrate. The conductive polymer may be selected from the group consisting of polyaniline, polypyrrole, polythiophene, poly(p-phenylene), poly (p-phenylenevinylene), poly(2,5-thienylenevinylene) and poly(3,4-ethylenedioxythiophene). Further, the dopant may be selected such that the combination of the conductive polymer and dopant is soluble in a solvent, and from the group consisting of camphor sulfonic acid (CSA) and dodecyl benzene sulfonic acid (DBSA), 2-Acrylamido-2-methylpropane sulfonic acid (AMPSA), hydrochloric acid, sulfuric acid and phosphoric acid.

Some embodiments relate to a system including an object, and a sensing device arranged to operatively contact the object to sense a thermal state of the object. The sensing device may include a substrate including a surface, a conductive polymer film arranged on the surface of the substrate, wherein the conductive polymer film may have one or more temperature reactive characteristics, and a pair of electrodes coupled to the polymer film. The pair of electrodes may be configured to communicate electrical signals to the conductive polymer film effective to measure the one or more temperature reactive characteristics, such that the thermal state of the object is determined. In some examples, the system further includes a controller which may be configured to receive data related to the measured one or more temperature reactive characteristics of the conductive polymer film and based on the received data, and adjust a characteristic (e.g., a thermal state, an electrical state, or both) of the object.

FIG. 1 illustrates a schematic diagram of a system 10 for manufacturing a sensing device, e.g., a temperature sensor with configurable sensitivity according to an embodiment. As shown, the system 10 includes a material preparation unit 12, a material verification unit 14, a film depositing unit 16, a film thickness measurement unit 18, and a characterization unit 20. A non-doped polymer material may not be sufficiently conductive to be used as a sensing element in a sensing device (or array). Accordingly, in some embodiments, the material preparation unit 12 is configured to dope a polymer, e.g., polyaniline, with a dopant, e.g., camphor sulfonic acid (CSA) such that the one or more electrical properties of the conducting polymer are modified to increase its conductivity. The doping may be accomplished in a solvent such as m-cresol. The solvent may be chosen such that the combination of the conducting polymer and dopant is soluble in the solvent, and the solution thus obtained can be further deposited as a uniform film on a substrate. In some embodiments, the conducting polymer film arranged on the surface of the substrate has one or more characteristics, e.g., resistance, conductance, impedance, etc., which may change in accordance with the temperature sensed by the conducting polymer film. The ratio of the conducting polymer to the dopant, as will be described in detail later, may be a factor that is used in configuring the amount of change of the one or more characteristics of the polymer film with temperature, and therefore may be used to tune the sensing element with a desired sensitivity value. The sensitivity of a sensing device manufactured by the system 10 may be configurable in the range of about 3 $\Omega/^\circ$ C. to about 130 $\Omega/^\circ$ C. Accordingly, in some embodiments, the ratio of the conducting polymer to the dopant in the material preparation unit 12 is selectable in a range of about 0.3 to about 1, e.g. about 1, about 0.5, or about 0.3, to obtain a sensing device with a desired sensitivity value.

In the material verification unit 14, the solution prepared in the material preparation unit 12 is verified for successful doping. The material verification unit 14 may further include one or more spectroscope devices, e.g., a Fourier Transform Infrared (FTIR) spectroscope and/or an Ultraviolet-visible (UV-Vis) spectroscope, configured to evaluate the solution. Other known spectroscopes or spectroscopy methods may be included in the material verification unit 14.

In some embodiments, a doped conducting polymer solution, e.g., CSA-doped polyaniline solution is coated or deposited as a thin film on a surface of a substrate, e.g., a polyamide substrate or polyethylene terephthalate (PET) substrate, in the film depositing unit 16. The polymer film may be deposited on the substrate surface such that the surface is covered partially or completely with the polymer film. A particular substrate may be chosen to deposit a polymer film thereon based on one or more of the following criteria: (a) the surface of the substrate is wetted by the doped polymer solution and provides good adhesion toward the polymer solution, (b) flexibility of the substrate, or (c) the substrate is not permanently deformed at a temperature near to the operating range of the sensing element or array.

For depositing a conducting polymer film on the substrate, the film depositing unit 16 may include a spin coating unit, or a print coating unit. The spin coating unit may be configured to deposit a substantially uniform film on the substrate such that the rotor speed on the spin coating unit is configurable to control the thickness of the polymer film. In some embodiments, the conducting polymer film arranged on the surface of the substrate has one or more characteristics, e.g., resistance, conductance, impedance, etc., which may change in accordance with the temperature sensed by the conducting polymer film. In some embodiments, the film thickness, as will be described in detail later, may be a factor that is used in configuring the amount of change in the one or more characteristics of the polymer film with temperature, and therefore may be used to tune the sensing element with a desired sensitivity value. The film thickness may vary from about 10 nm to about 150 nm. The print coating unit may employ known printing techniques to coat a conducting polymer film on the substrate. Other known coating techniques such as spray coating, dip coating, etc. may be used instead of, or in addition to, the coating units mentioned above.

In some embodiments, the film thickness measurement unit 18 is configured to measure the thickness of the conducting polymer film on the substrate using, e.g., surface profilometry. In surface profilometry, a very thin tipped stylus is scanned across the polymer film on which a groove (extending to the substrate) has been intentionally created. When the stylus drops in the groove, the film thickness measuring unit 18 measures the distance that the stylus dropped, thereby measuring the thickness of the polymer film.

The film thickness measurement unit 18 can be configured to utilize other measurement techniques such as, ellipsometry and optical profilometry may be used instead of, or in addition to, the surface profilometry technique. In ellipsometry, the film thickness is measured by measuring one or optical properties of the film. For example, the amount of refraction or absorbance is a function of the film thickness. In optical profilometry, the film thickness is measured by illuminating the surface of the film with a laser and detecting an amount of refraction or absorbance of the light with a light detector without physically contacting the film surface, instead of the thin tipped stylus in surface profilometry.

After measuring the film thickness, one or more pair of terminals, e.g., silver electrodes, and/or other circuitry may be coupled to the conducting polymer film such that the polymer film may be operatively connected with an electrical device. Other materials such as copper, aluminum and other known conducting metals may be used instead of, or in addition to, silver for electrodes.

In some embodiments, the characterization unit 20 is configured to characterize the conducting polymer film in terms of the film's electrical properties e.g., conductivity, resistance and/or sensitivity, with respect to variation in, e.g., the film temperature. For film characterization, the conducting polymer film may be connected through the terminals to one or more electrical devices such as a power source, a heating element, a meter measuring an electrical characteristic, a computer including a controller software module, a computer including a microprocessor configured as controller, etc. The electrical signals generated by the polymer film may be indicative of one or more temperature-reactive electrical characteristics of the polymer film. In one embodiment, these characterization signals are provided as an input to a controller system to control the operation of the sensing device. A wireless transceiver unit may be coupled with the polymer film to wirelessly transmit characterization signals to and receive control signals from the controller system.

Figure 2:
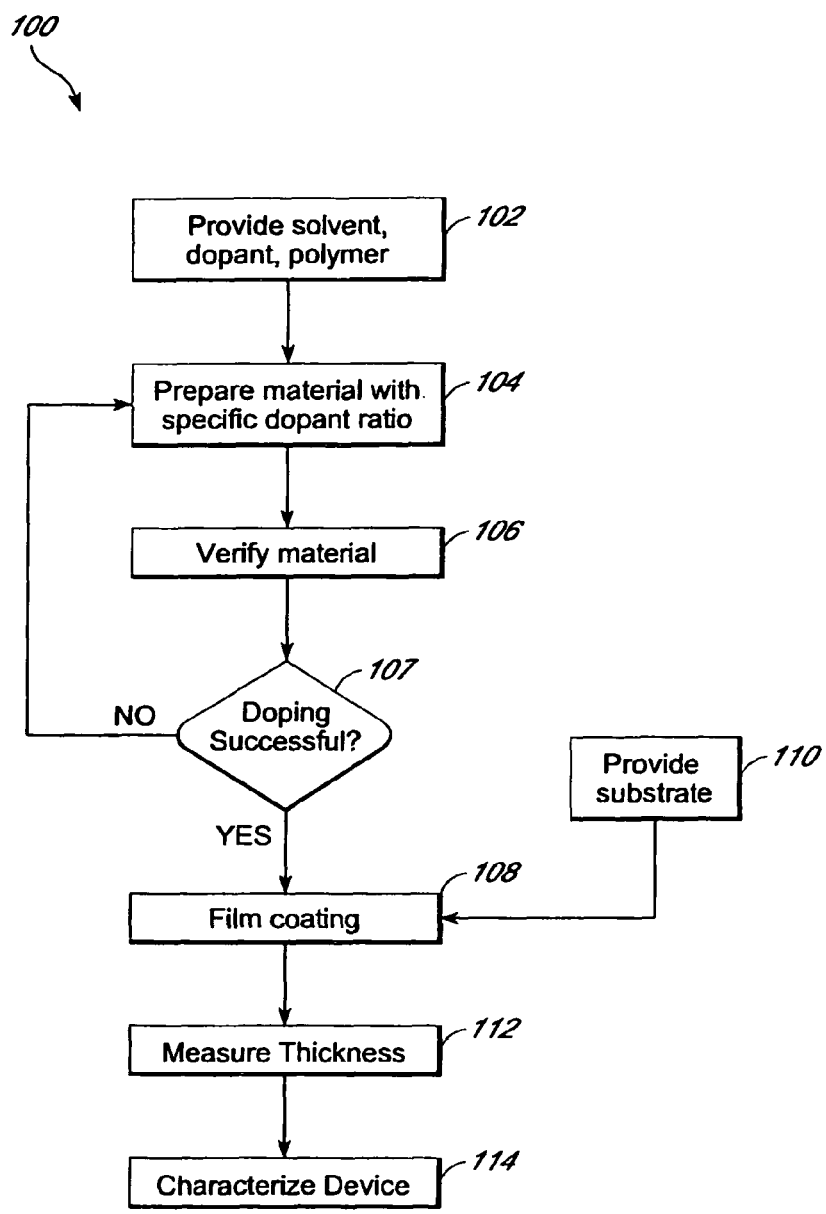
FIG. 2 is a flow chart of a method of manufacturing a device according to some embodiments.

FIG. 2 is a flow chart of a method 100 of manufacturing a device according to some embodiments, which may utilize the system 10 from FIG. 1. Method 100 may include one or more functions, operations, or actions as depicted by blocks 102, 104, 106, 107, 108, 110, 112 and/or 114. In some implementations, the various features of the illustrated blocks for method 100 may be combined into fewer blocks, divided into additional blocks, or eliminated based on the desired result.

Processing for method 100 may begin at block 102, "Provide solvent, dopant, polymer." Block 102 may be followed by block 104, "Prepare material with specific dopant ratio." Block 104 may be followed by block 106, "Verify material." Block 106 may be followed by block 107, "Doping Successful." Block 107 may be followed by block 104 when the doping is determined to be unsuccessful. Otherwise, block 107 may be followed by block 108, "Film Coating" when the doping is determined to be successful. Block 110, "provide substrate", may also be followed by block 108. Block 108 may be followed by block 112, "Measure thickness." Block 112 may be followed by block 114, "Characterize device."

At block 102, a conducting polymer (e.g., polyaniline) a dopant (e.g., CSA), and a solvent (e.g., m-cresol) are provided to the material preparation unit 12 for doping the conducting polymer with the dopant in the solvent. The doped conducting polymer (i.e., CSA-doped polyaniline in our case) may be prepared (at block 104) using one of the following example processes:

1a) Doping polyaniline emerladine base (PANI EB) with CSA (Ex-situ), or

1b) Doping PANI with CSA without HCl for the polymerization of aniline (In-situ).

In process 1a, PANI EB is prepared by chemical oxidative polymerization of aniline in the presence of HCl by using an aqueous solution of ammonium persulphate (($NH_4$)$_2S_2O_8$), followed by reaction with ammonium hydroxide. In some embodiments, PANI EB may be doped with CSA by using different quantities of CSA, thus varying the ratio of polymer to dopant in the conducting polymer solution. For example, three different samples of doped conducting polymers were prepared by using 0.5 gram of PANI EB in each sample and using 0.3 gm, 0.5 gm and 1 gm of CSA in respective samples. These samples are represented as doping ratios of 0.3, 0.5 and 1, respectively. As will be discussed below, different dopant ratios in the polymer solution may be used to vary the sensitivity of the sensing device produced using this polymer solution.

Figure 10:
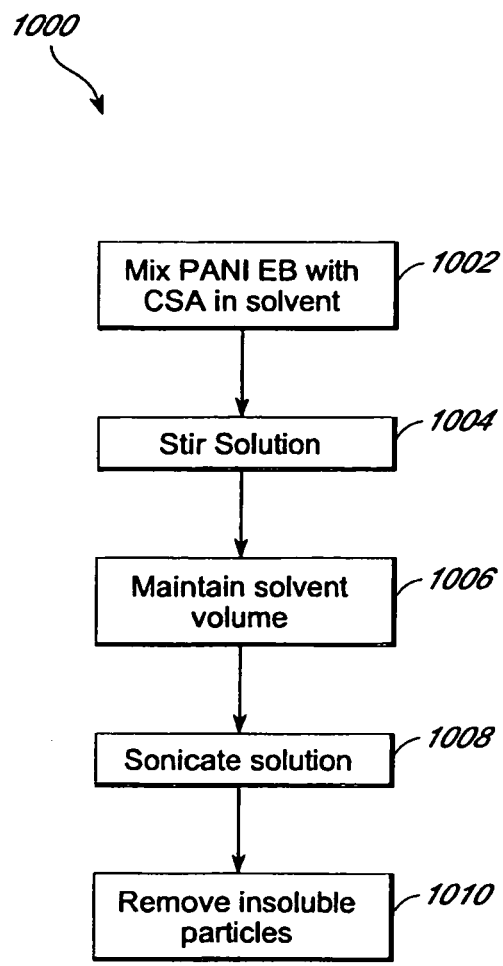
FIG. 10 is a flow chart of a method of doping PANI EB with CSA according to some embodiments.

FIG. 10 is a flow chart of a method 1000 of doping PANI EB with CSA according to some embodiments. Method 1000 may include one or more functions, operations, or actions as depicted by blocks 1002, 1004, 1006, 1008, and/or 1010. In some implementations, the various features of the illustrated blocks for method 1000 may be combined into fewer blocks, divided into additional blocks, or eliminated based on the desired result. Processing for method 1000 may begin at block 1002, "Mix PANI EB and CSA in solvent." Block 1002 may be followed by block 1004, "Stir solution." Block 1004 may be followed by block 1006, "Maintain solvent volume." Block 1006 may be followed by block 1008, "Sonicate solution." Block 1008 may be followed by block 1010, "Remove insoluble particles."

At block 1002, doping may be initiated by mixing both PANI EB and CSA directly in a m-cresol solvent. At block 1004, the mixed solution (obtained from block 1002) may be stirred for about six hours. The stirring may be accomplished by stirring manually, or mechanically using, e.g., a magnetic rod stirrer. While stirring the solution, an appropriate volume of the solvent may be maintained (at block 1006) by providing additional m-cresol solvent in the solution, if required. Following the stirring (at block 1004) while maintaining the solvent volume in the solution (at block 1006), the solution may be sonicated (at block 1008) for about 15 minutes followed by keeping the solution undisturbed for enough time for heavy insoluble particles to settle down. In some embodiments, sonication is performed by applying ultrasound energy to the solution using an ultrasonic probe. The insoluble particles may then be removed (at block 1010), e.g., by centrifugal force by rotating the solution for about 10 minutes at the rate of, e.g., 10000 rpm. The rotation of the solution may be accomplished by placing the container holding the solution on a rotation plate which may be electrically operated to rotate at different speeds. After the removal of insoluble particles, the CSA-doped PANI EB solution (in m-cresol) may be provided to the material verification module 14.

Figure 11:
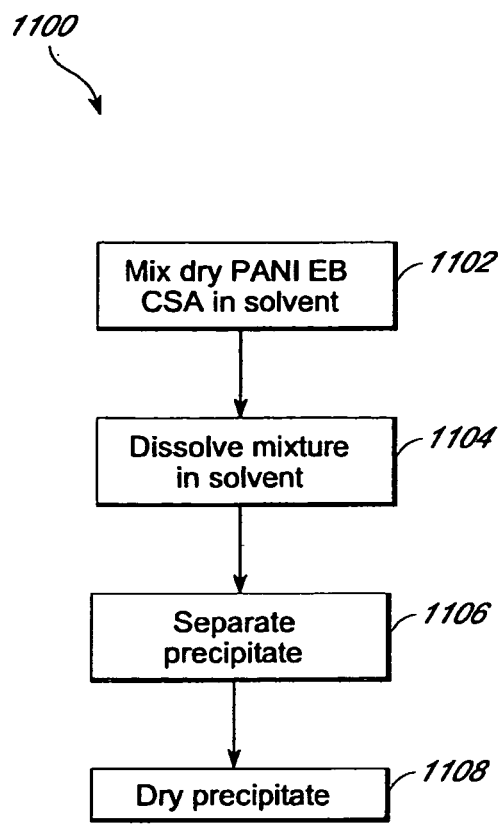
FIG. 11 is a flow chart of an alternative method of doping PANI EB with CSA according to some embodiments.

FIG. 11 is a flow chart of an alternative method 1100 of doping PANI EB with CSA according to some embodiments. Method 1100 may include one or more functions, operations, or actions as depicted by blocks 1102, 1104, 1106, and/or 1108. In some implementations, the various features of the illustrated blocks for method 1100 may be combined into fewer blocks, divided into additional blocks, or eliminated based on the desired result. Processing for method 1100 may begin at block 1102, "Mix PANI EB and CSA." Block 1102 may be followed by block 1104, "Dissolve mixture in solvent." Block 1104 may be followed by block 1106, "Separate precipitate." Block 1106 may be followed by block 1108, "Dry precipitate."

At block 1102, instead of mixing PANI EB and CSA directly in an m-cresol solvent as described in FIG. 10, a dry powder form for mixture of PANI EB and CSA may first be obtained, and then, at block 1104, the mixed powered PANI EB-CSA may be dissolved in distilled water as a solvent to obtain the CSA-doped PANI EB solution. In distilled water, doped polyaniline may remain in suspension. At block 1106, the precipitate of CSA-doped PANI EB may be separated out, e.g., by using a filter paper. The precipitate may be then dried (at block 1108) using, e.g., vacuum drying by keeping the precipitate under vacuum at about −760 mmHg at about 6° C. for about 48 hours. Instead of, or in addition to, vacuum drying, gas drying technique may be used to dry the precipitate.

In process 1b, CSA-doped PANI may be obtained by polymerizing aniline in the presence of CSA using an aqueous solution of ($NH_4$)$_2S_2O_8$. A precipitate of CSA-doped PANI may be obtained following the completion of polymerization. The precipitate may be washed one or more times with acetone and distilled water, alternately. The CSA-PANI polymer may then be dried under vacuum at about 6° C. for about 48 hours, and then mixed in m-cresol solvent to obtain the desired CSA-doped PANI solution.

At block 106, the CSA-doped PANI (doped conducting polymer) solution is verified for successful doping using the material verification unit 14. Material verification may be done using one or more of the following processes:

2a Physical Appearance Test

2b) Fourier Transform Infrared (FTIR) Spectroscopy, or

2c) Ultraviolet-visible (UV-Vis) Spectroscopy.

For process 2a, the color of the doped polymer solution may be checked at block 107 (FIG. 2) to verify the doping of the polymer. For example, if the color of the CSA-doped PANI solution obtained using either of the two above-described material preparation processes is green. This indicates that the doping has been performed successfully. In another embodiment, if PANI EB has been doped using N-Methyl-2-pyrrolidone (NMP) and appears to be blue, successful doping of the conducting polymer is indicated. Otherwise, the process goes back to step 104 for material preparation.

In process 2b, the measurements may be done at room temperature using, e.g., a Bruker™ (Vertex-70) FTIR spectroscope on thin pellets made using KBr. Measurements may be done in the range of about 4000 $cm^{-1}$-400 $cm^{-1}$ with a resolution of about 8 $cm^{-1}$. This range of wavenumber/wavelength may be used for characterization of CSA-doped PANI solution to provide information about different type of bonds present in the solution.

Figure 3:
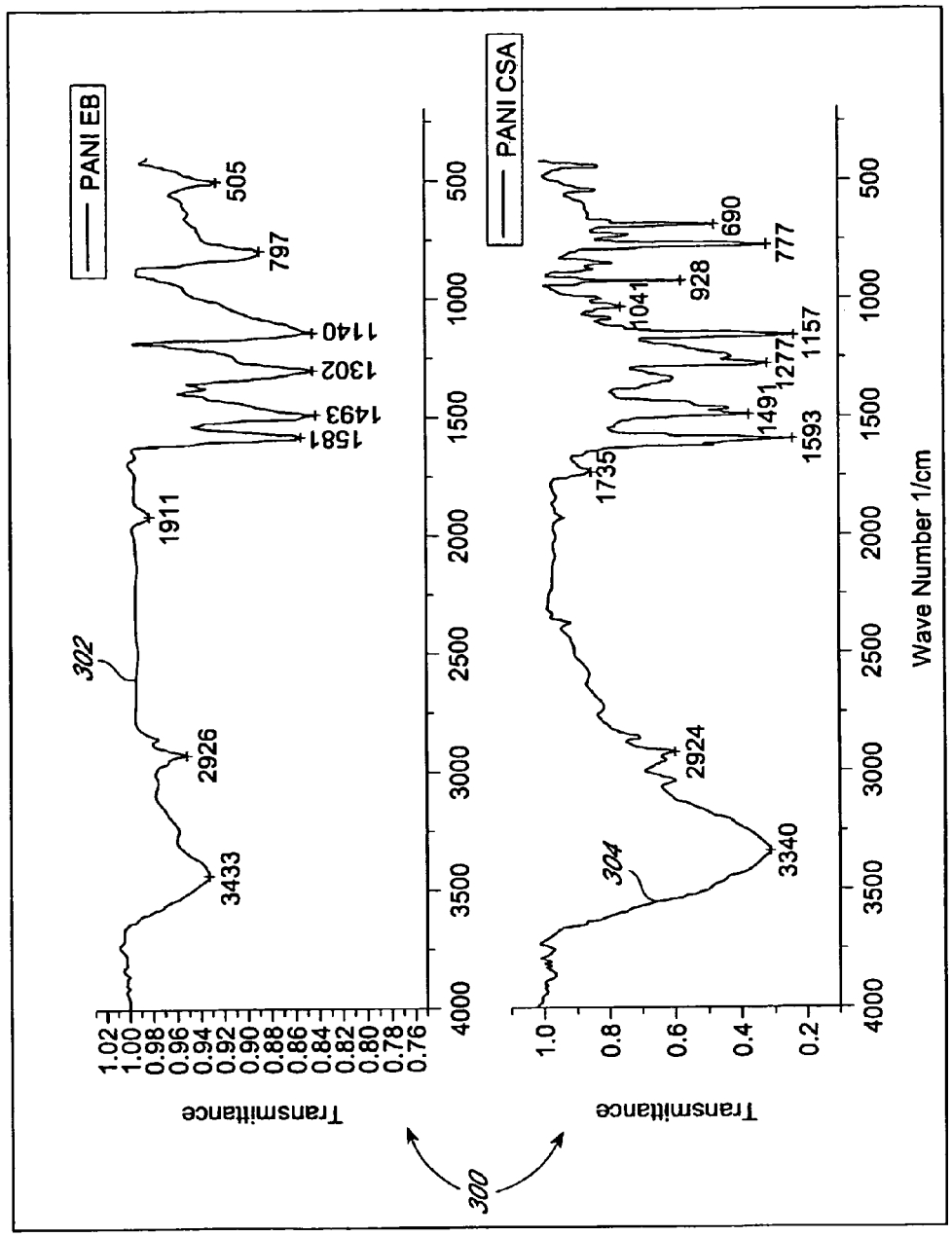
FIG. 3 shows graphs for results of Fourier Transform Infrared (FTIR) spectroscopy.

FIG. 3 shows graphs for results of Fourier Transform Infrared (FTIR) spectroscopy. The energy for this wavenumber/wavelength generally matches the vibration frequencies of different types of chemical bonds present in the CSA-doped PANI solution, thereby providing a "blue print" of the polymer solution. FTIR plots 300 of PANI EB (curve 302) and PANI CSA (curve 304) in m-cresol using FTIR spectroscopy are shown in FIG. 3. The peak at 3433 $cm^{-1}$ corresponds to N—H bond stretching. The peak at 1493 $cm^{-1}$ and at around 1500 $cm^{-1}$ indicate a qualitative measure of the oxidation of the polymer. In other words, the bands around 1500-1600 $cm^{-1}$ correspond to quinoid and benzenoid ring stretches. The $C_{aromatic}$—N vibration is indicated by the peak at 1302 $cm^{-1}$, =C—H peak at 2926 $cm^{-1}$. The peak at 505 $cm^{-1}$ corresponds to N—H out-of-plane bending. The additional peaks at 1157 cm$^{-1}$ correspond to SO$_3$ stretch, and peaks at 1041 cm$^{-1}$ and 690 cm$^{-1}$ correspond to S=O stretch.

Figure 4A:
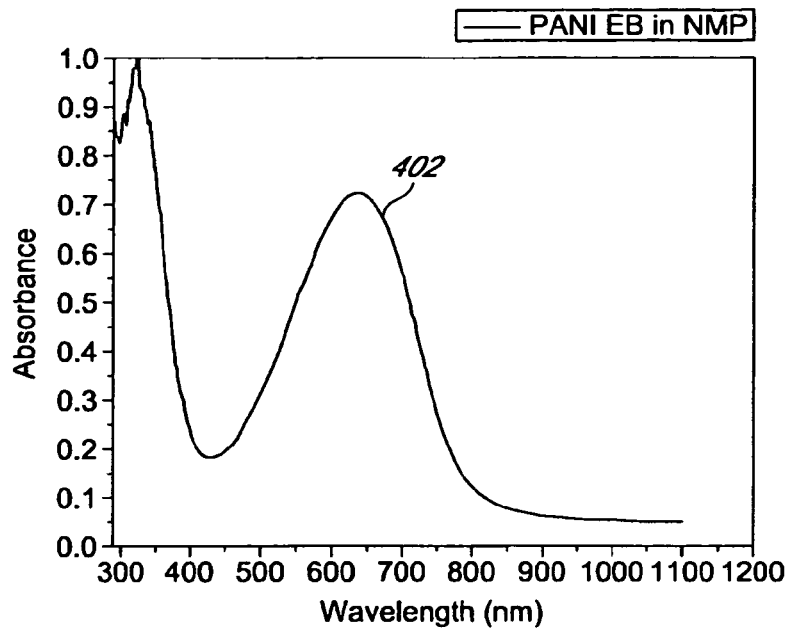
FIGS. 4A and 4B are graphs for results of Ultraviolet-visible (UV-Vis) spectroscopy.
Figure 4B:
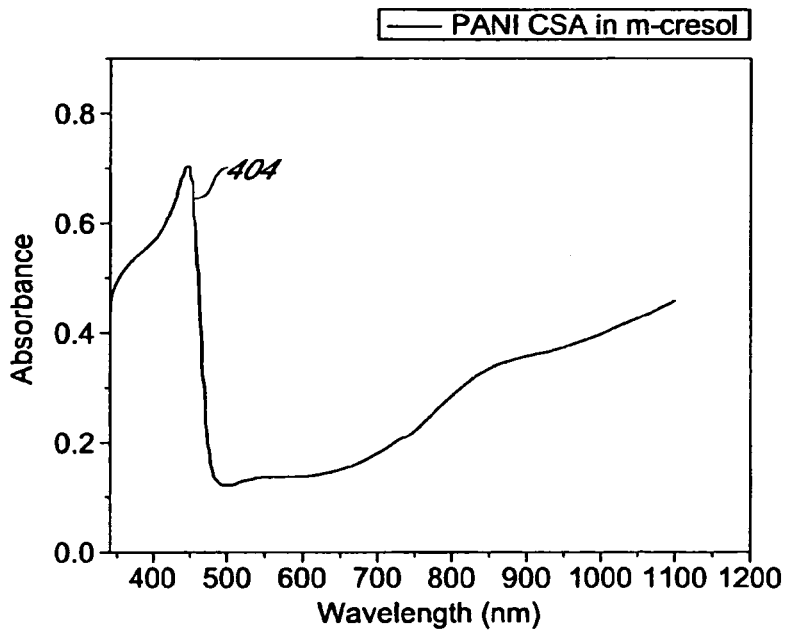

In process 2c, UV-Vis spectroscopy may be used for characterizing materials based on the pattern of absorption of incident UV-Vis radiation. FIGS. 4A and 4B are graphs for results of Ultraviolet-visible (UV-Vis) spectroscopy. As shown in FIG. 4A, the UV-Visible spectrum curve (402) of the CSA-doped PANI in NMP solution is characterized by two major absorption bands, i.e., a first absorption band at wavelength 320 nm and a second band at wavelength 650 nm. The first band is associated with the π-π* transition of the conjugated ring systems and the second is with the benzenoid to quinoid excitonic transition. As shown in FIG. 4B, the UV-Vis spectrum curve (404) for CSA-doped PANI in m-cresol solution, where it can be seen that the absorption peak is obtained at about 460 nm wavelength.

After material verification, at block 108, the doped conducting polymer solution is coated on a substrate, e.g. a polyethylene terephthalate (PET) substrate (provided at step 110) using film coating unit 16. Coating may be accomplished, for example, by spin coating, printing, spray coating and dip coating. In some embodiments, a spin coating technique is used in which a doped polymer solution obtained in m-cresol (e.g., CSA-doped PANI solution) is coated on a square (e.g., of dimensions 2 cm×2 cm) PET substrate while the substrate is spinned or rotated at a particular rotation speed (measured in revolution per minute (rpm)). Other shapes and sizes of substrate may be used. The coated film is then dried in a vacuum at about 6° C. for about four hours to obtain a substantially uniform film of conducting polymer on the substrate. In this coating technique, the thickness of the conducting polymer film may be controlled by varying the rotation speed (rpm) at which the polymer is deposited on the substrate. As will be discussed below, a variable thickness of polymer film may be used to vary the sensitivity of the sensing device using this polymer film. Different example rotation speeds and approximate film thickness values that may be obtained using those spin coating speeds are listed in Table 1. Other rotation speeds, of course, may be used. It is apparent from the values listed below that the film thickness is inversely proportional to the rotation speed.

TABLE 1

| Thickness (nm) | Rotation Speed (rpm) |
|---|---|
| 80.6 | 1000 |
| 54.9 | 1500 |
| 16.6 | 2000 |

The inversely-proportional relationship between the thickness of the film and rotation speed may be maintained at a constant viscosity of the coated polymer solution and for a particular substrate used. In another embodiment, the film thickness may be varied by changing the viscosity of the polymer solution (e.g., by adding a solvent) and spin coating at a constant rotation speed.

After film coating, the thickness of the film is measured for accuracy at step 112 using the thickness measuring unit 18. Measurement may be accomplished using one or more of surface profilometry, ellipsometry, and optical profilometry techniques.

Figure 5B:
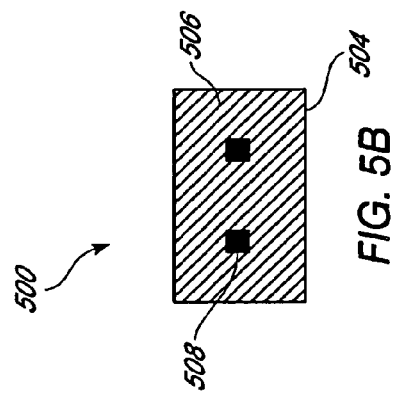
FIGS. 5A-5D depict different embodiments of a sensing device according to various embodiments.
Figure 5D:
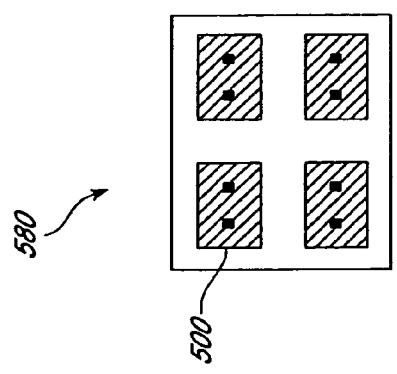
Figure 5A:
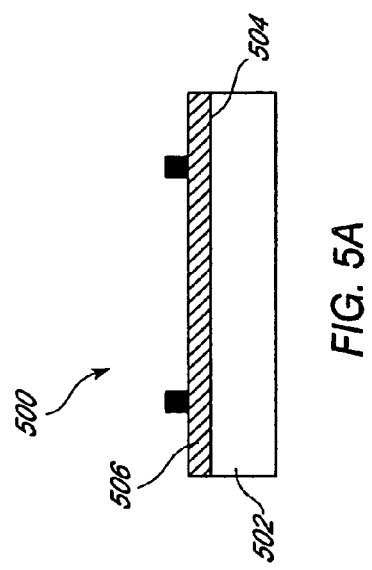
Figure 5C:
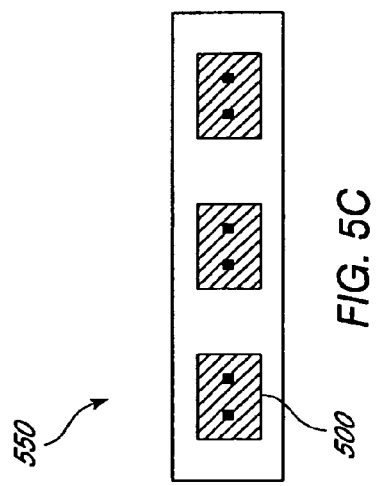

FIGS. 5A-5D depict different embodiments of a sensing device according to various embodiments. An example sensing device 500 is depicted in its side view in FIG. 5A (side view) and FIG. 5B (top view). As shown, the device 500 includes a substrate 502 having a surface 504, a conducting polymer film 506 on the surface 504, and electrode terminals 508 coupled with the film 506. The electrode terminals may be placed anywhere on the polymer film 506. The sensing device 500 may be used as a discrete device or a plurality of sensing devices 500 may be used as a sensing array. An embodiment of such a sensing array 550 arranged in one dimension is shown in FIG. 5C. Another embodiment, which includes a sensing array 580 arranged in two dimensions, is shown in FIG. 5D. In the sensing arrays shown in FIGS. 5C and 5D, individual sensing devices 500 may be connected with one or more of the other devices 500 (in the array) in series, in parallel, or in a combination of series and parallel using respective electrodes 508. In another embodiment, devices 500 in the array 550 or 580 may not be connected with another device 500 in the array. Arrays 550, 580 may be connected with external electrical devices such as a power source, electrical meter, controller unit, etc.

Figure 6:
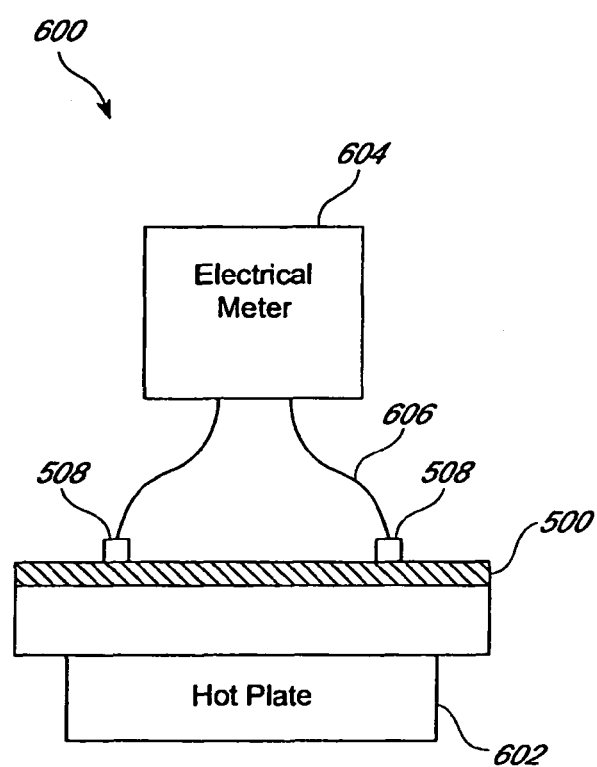
FIG. 6 is a schematic diagram for a system for characterizing a sensing device according to some embodiments.

At block 114, the temperature sensing device 500 is characterized using the characterization unit 20 in terms of the device's electrical properties e.g., conductivity, impedance, resistance and/or sensitivity with respect to variation in temperature. FIG. 6 is a schematic diagram for a system 600 for characterizing the device 500 according to some embodiments. System 600 may include a heating device 602 (e.g., a hot plate) configured to generate heat at variable temperatures, and an electrical meter 604 configured to measure one or more electrical characteristics (e.g., resistance, conductance) of the polymer film (and thus, of the device 500). The device 500 can be placed on heating device 602 to receive heat at different temperatures. The meter 604 is operatively connected to the terminals 508 using connection 606, and configured to measure a temperature-reactive characteristic, e.g., resistance of the device 500 at varying temperatures.

Figure 7:
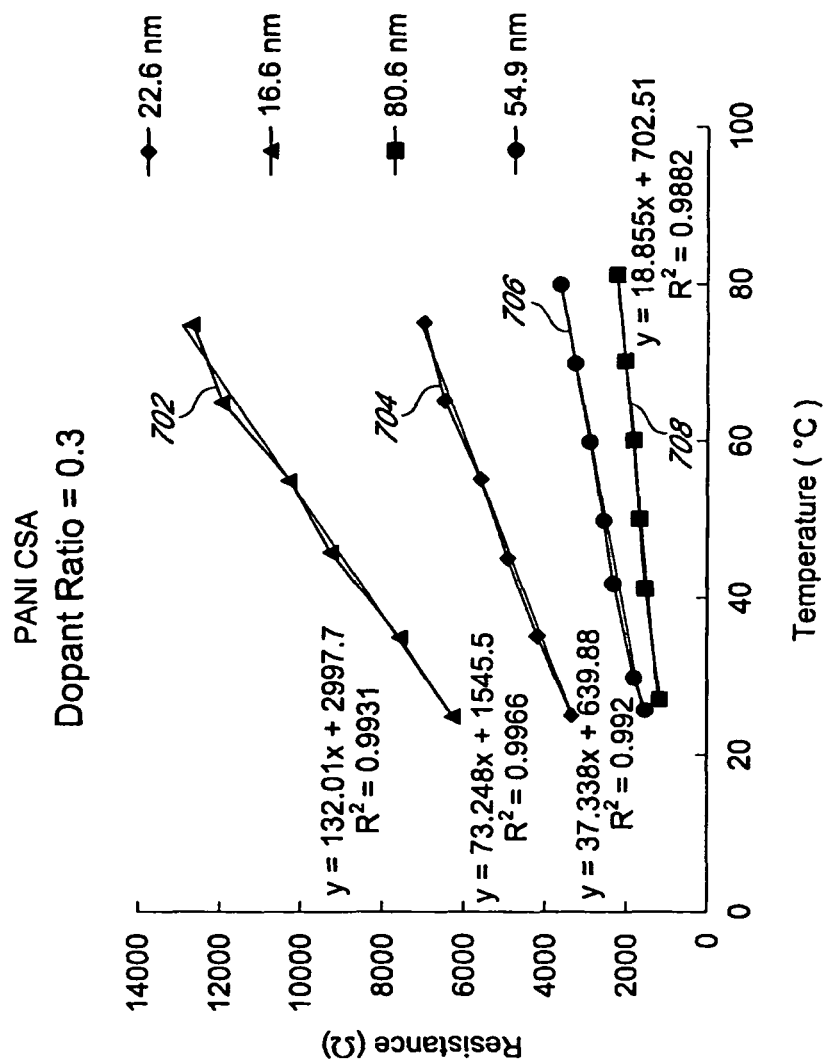
FIG. 7 shows different curves depicting change in resistance of a device as a function of temperature according to some embodiments.

FIG. 7 shows different curves depicting the changing film resistance as a function of temperature according to some embodiments. As illustrated in the curves, temperature is varied from about 25° C. to about 80° C., and the conducting film has a fixed dopant ratio, i.e., ratio=0.3. Different film thicknesses are considered, i.e., thickness=16.6 nm (curve 702), 22.6 nm (curve 704), 54.9 nm (curve 706) and 80.6 nm (curve 708). As seen in those curves, for various chosen thicknesses, the resistance of the polymer film increases with the increasing temperature. The slopes of these curves (i.e., the rate of change of resistance with respect to temperature) indicate the sensitivity values for the conducting polymer films for respective thicknesses. Similar experiments were performed for other specific dopant ratios (results not shown).

Figure 8:
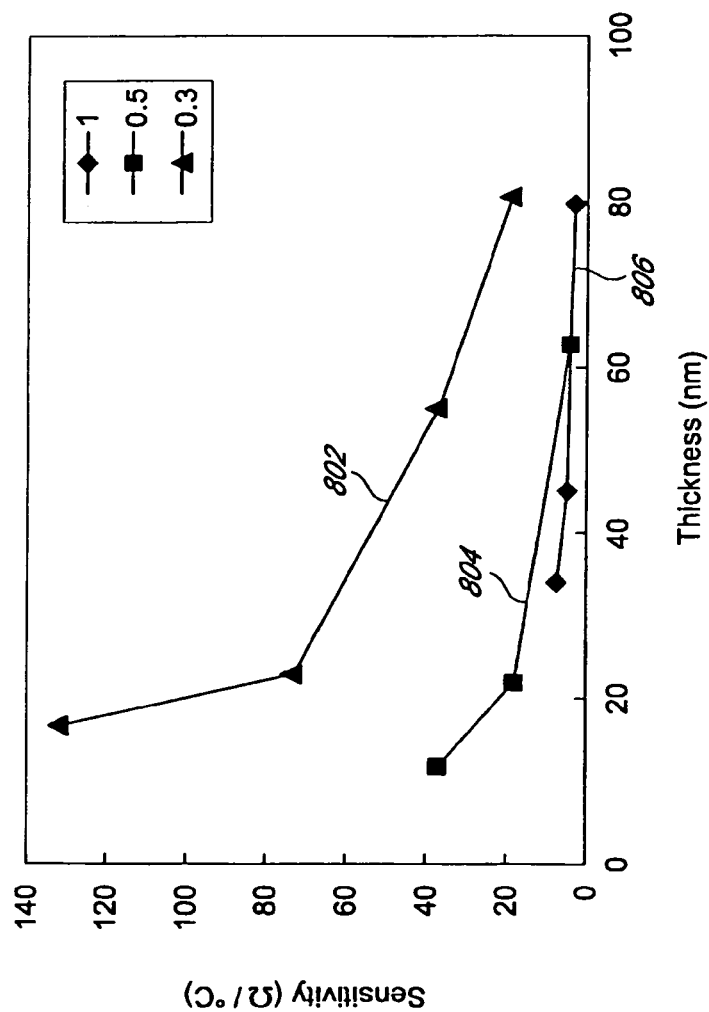
FIG. 8 shows various plots depicting the variation of sensitivity of a conducting polymer film with varying film thicknesses for specific dopant ratios, according to some embodiments.

FIG. 8 shows various plots depicting the variation of sensitivity of a conducting polymer film with varying film thicknesses for specific dopant ratios, according to some embodiments. For example, curve 802 corresponds to dopant ratio=0.3, curve 804 corresponds to dopant ratio=0.5, and curve 806 corresponds to dopant ratio=1.0. As is apparent, the sensitivity decreases as the film thickness is increased, and a higher dopant ratio at lower thicknesses provides higher sensitivity. A sensitivity as high as about 130 Ω/° C. was obtained, e.g., for dopant ratio=0.3 and thickness equal to about 18 nm. It may also been seen that for polymer film thicknesses less than 100 nm, e.g., less than 80 nm or less than 60 nm, higher sensitivity (e.g., sensitivity=130 Ω/° C.) may be achieved. It has also been observed that a tunable sensitivity may be obtained by selecting an appropriate film thickness and dopant ratio. That is, the sensitivity of the film may be selected by selecting the film thickness and dopant ratio. As can also be seen in FIG. 8, the effect of film thickness and dopant concentration on the sensitivity becomes negligible for thickness greater than about 100 nm. Indeed, at dopant ratio of about 1.0, the sensitivity becomes negligible at thickness of about 60 nm.

Table 2 provides comparative sensitivity data for flexible temperature sensors manufactured by Minco, Inc. Included in Table 2 are data for various metal sensors including platinum, copper, nickel, and nickel iron.

TABLE 2

| Element material | Temperature range | Benefits | Typical base resistance | Sensitivity (Avg. Ω/° C. to 100° C.) |
| --- | --- | --- | --- | --- |
| Platinum | −250 to 850° C. (−436 to 1562° F.) | Great range Best stability Good linearity | 100 Ω at 0° C. 1000 Ω at 0° C. | 0.39 3.9 |
| Copper | −100 to 260° C. (−148 to 500° F.) | Best linearity | 10 Ω at 25° C. | 0.04 |
| Nickel | −100 to 260° C. (−148 to 500° F.) | Low cost High sensitivity | 100 Ω at 0° C. 120 Ω at 0° C. | 0.62 0.81 |
| Nickel-iron | −100 to 204° C. (−148 to 400° F.) | Low cost High sensitivity | 604 Ω at 0° C. 1000 Ω at 70° F. 2000 Ω at 70° F. | 3.13 4.79 9.58 |

Comparing values listed in table 2 and plotted in curves of FIG. 8, it can be seen that the conducting polymer-based sensing devices provide a higher sensitivity value (of about 130 Ω/° C.) as compared to the highest sensitivity value listed in Table 2 (Nickel-iron sensing element, sensitivity about 10 Ω/° C.). Also, it is apparent, that the polymer-based sensing element provides a bigger range of sensitivity values e.g., from about 3 Ω/° C. to about 130 Ω/° C.

Figure 9:
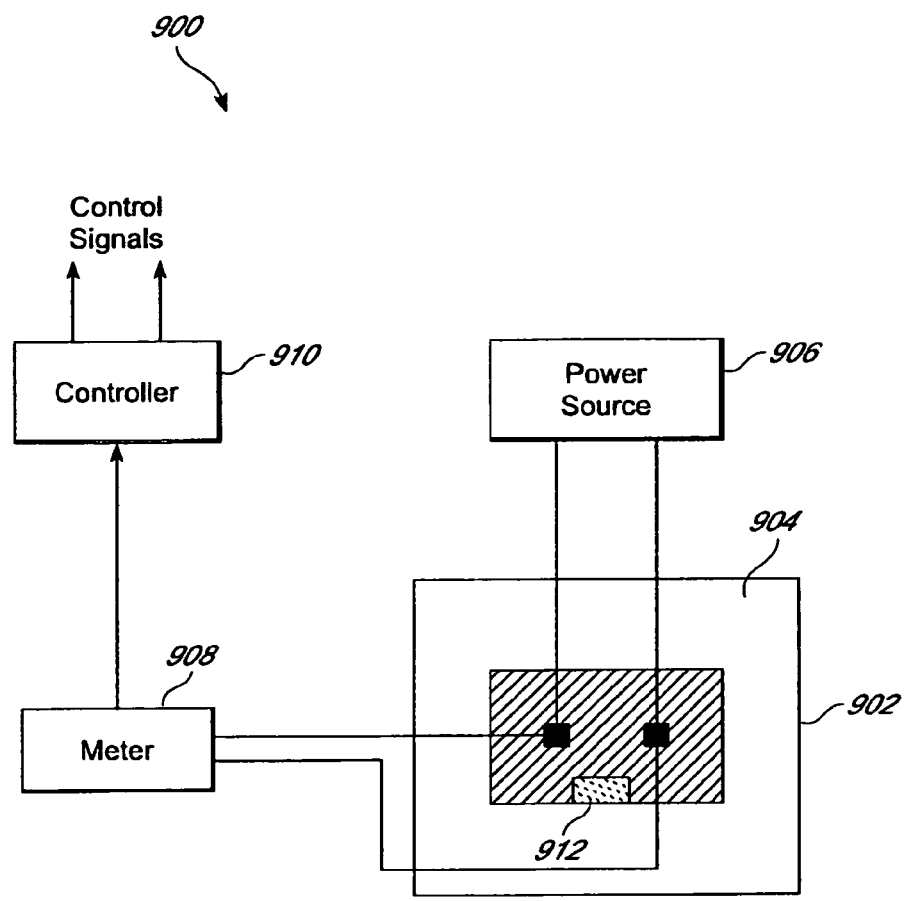
FIG. 9 is a schematic diagram of system using a sensing device according to some embodiments.

FIG. 9 is a schematic diagram of a system 900 using a sensing device 500 arranged according to some embodiments described herein. The system 900 includes an object 902 having a surface 904, a power source 906, temperature sensor 500 including terminals 508, an electrical meter 908 and a controller 910. The object 902 may be an object that may be exposed to varying temperature, for example, a solar cell, light emitting diode (LED) (or any other electrical or electronic component), flexible pack used for packaged food, storage pack used for storing body fluids (e.g., blood). The temperature variation may be harmful for the object 902 or for the system of which it is a part. Accordingly, a thermal state (e.g., temperature) of the object 902 may be monitored, and based on the monitored thermal state, the temperature, operational state, or both, of the object may be adjusted. The temperature sensor 500 may be arranged on the surface 904 of the object 902 such that the sensor 500 is exposed to and is able to sense the temperature at the surface 904. The sensor 500 may be operatively coupled to the power source 906 at terminals 508 to receive an electrical signal of, e.g., constant voltage or constant current across the conducting polymer film of the device 500. The device 500 may also be coupled to the electrical meter 908 to measure an electrical characteristic (e.g., resistance) of the device 500 while the signal from the power source 906 is supplied to the device 500. The measured electrical characteristic may be indicative of the specific temperature experienced by the object 902.

In some embodiments, the power source 906 and the meter 908 are combined in one electrical device. The meter 908 or the combined power source and meter may be configured to provide data corresponding to the measured electrical characteristic (e.g., the resistance value) of the device 500 to the controller 910. Based on the resistance value, the controller 910 may be configured to adjust a characteristic of the object 902. For example, if the resistance value indicates that the temperature of the object is greater or lower than an acceptable value, the controller may be configured to adjust the temperature by actuating a cooling or heating unit (not shown) in the system 900. Instead of, or in addition to, adjusting the temperature, the controller 910 may be configured to adjust an operational state of the object 902, e.g., by temporarily switching off (or disabling) the object 902 (if the object 902 is an electrical or electronic component). As discussed above in reference to FIG. 1, a wireless transceiver 912 may be coupled with the polymer film of device 500 and may be configured to wirelessly transmit and receive signals to a controller (which may also be provided with a wireless transceiver to wireless communication).

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A device comprising:
   a substrate including a surface;
   a conductive polymer film arranged on the surface of the substrate, wherein the conductive polymer film has a resistance that changes with temperature, and wherein the conductive polymer has a thickness in a range from about 10 nm to about 150 nm;
   a pair of electrodes coupled to the polymer film, wherein the pair of electrodes are configured to communicate electrical signals to the conductive polymer film effective to measure the resistance; and
   a meter operatively coupled to the conductive polymer film and configured to measure the resistance of the conductive polymer film
   wherein the device is configured as a temperature sensor with a substantially linear temperature sensitivity over a temperature range of about 25° C. to about 80° C.

2. The device of claim 1, wherein the thickness of the conductive polymer film on the substrate is less than about 80 nm.

3. The device of claim 1, wherein the conductive polymer of the conductive polymer film is doped with a dopant.

4. The device of claim 3, wherein a ratio of the conductive polymer to the dopant is in a range of about 0.3 to about 1.

5. The device of claim 1, wherein the substrate is flexible.

6. The device of claim 1, wherein the substrate is selected from the group consisting of polyethylene terephthalate (PET) substrate and polyimide substrate.

7. The device of claim 1, wherein the conductive polymer film comprises a polymer selected from the group consisting of polyaniline, polypyrrole, polythiophene, poly(p-phenylene), poly(p-phenylenevinylene), poly(2,5-thienylenevinylene) and poly(3,4-ethylenedioxythiophene).

8. The device of claim 3, wherein the dopant is selected from the group consisting of camphor sulfonic acid (CSA) and dodecyl benzene sulfonic acid (DBSA), 2-Acrylamido-2-methylpropane sulfonic acid (AMPSA), hydrochloric acid, sulfuric acid and phosphoric acid.

9. The device of claim 1, wherein the conductive polymer film is deposited on the substrate using a technique selected from the group consisting of spin coating technique, polymer printing technique, spray coating technique and dip coating technique.

10. The device of claim 1, wherein the device is configured as a temperature sensor with a tunable sensitivity range of about 3 Ω/° C. to about 130 Ω/° C.

11. A method for manufacturing a device, the method comprising:
   providing a substrate;
   depositing a conductive polymer film on the substrate, wherein the conductive polymer film has a resistance that changes with temperature and wherein depositing further comprises:
      controlling a thickness of the conductive polymer film on the substrate, wherein controlling the thickness comprises configuring the thickness to be in a range from about 10 nm to about 150 nm; and
      selecting a ratio of the conductive polymer to a dopant used therewith;
   coupling a pair of electrodes to the conductive polymer film, wherein the pair of electrodes are configured to communicate electrical signals to the conductive polymer film; and
   operatively coupling a meter to the conductive polymer via the pair of electrodes, wherein the meter is configured to measure the resistance of the conductive polymer film wherein the device is configured as a temperature sensor with a sensitivity within the range of about 3 Ω/° C. to about 130 Ω/° C.

12. The device manufacturing method of claim 11, wherein depositing the conductive polymer film on the substrate comprises using a technique selected from the group consisting of spin coating the polymer film on the substrate, printing the polymer film on the substrate, spray coating the polymer film on the substrate, and dip coating the polymer film on the substrate.

13. The device manufacturing method of claim 11, wherein the substrate is flexible.

14. The device manufacturing method of claim 11, wherein providing the substrate comprises selecting the substrate from the group consisting of polyethylene terephthalate (PET) substrate and polyimide substrate.

15. The device manufacturing method of claim 11, wherein depositing the conductive polymer on the substrate further comprises selecting the conductive polymer from the group consisting of polyaniline, polypyrrole, polythiophene, poly(p-phenylene), poly(p-phenylenevinylene), poly(2,5-thienylenevinylene), and poly(3,4-ethylenedioxythiophene).

16. The device manufacturing method of claim 11, wherein depositing the conductive polymer on the substrate further comprises selecting the dopant from the group consisting of camphor sulfonic acid (CSA) and dodecyl benzene sulfonic acid (DBSA), 2-Acrylamido-2-methylpropane sulfonic acid (AMPSA), hydrochloric acid, sulfuric acid and phosphoric acid.

17. The device manufacturing method of claim 11, wherein controlling the thickness of the conductive polymer film on the substrate comprises configuring the thickness to be less than about 80 nm.

18. The device manufacturing method of claim 11, wherein selecting the ratio of the conductive polymer to the dopant comprises selecting the ratio in a range of about 0.3 to about 1.

19. A system comprising:
an object; and
a sensing device arranged to operatively contact the object for sensing a thermal state of the object, the sensing device comprising:
  a substrate including a surface;
  a conductive polymer film arranged on the surface of the substrate,
wherein the conductive polymer film has a resistance that changes with temperature, and wherein the conductive polymer has a thickness in a range from about 10 nm to about 150 nm;
  a pair of electrodes coupled to the polymer film, wherein the pair of electrodes are configured to communicate electrical signals to the conductive polymer film; and
a meter operatively coupled to the conductive polymer film via the pair of electrodes and configured to measure the resistance of the conductive polymer film such that the thermal state of the object is determined
  wherein the device is configured as a temperature sensor with a substantially linear temperature sensitivity over a temperature range of about 25° C. to about 80° C., and
  wherein the device is configured as a temperature sensor with a sensitivity within the range of about 3 Ω/° C. to about 130 Ω/° C.

20. The system of claim 19, further comprising a controller operatively coupled to the meter, wherein the controller is configured to receive data from the meter, and adjust a characteristic of the object in accordance with the received data, wherein the received data is related to the measured resistance of the conductive polymer film.

21. The device of claim 1, wherein the thickness of the conductive polymer film on the substrate is less than about 60 nm.

22. The device of claim 1, wherein the resistance of the conductive polymer film increases with temperature.

23. The device of claim 10, where the sensitivity of the device is greater than about 20 Ω/° C.

* * * * *

UNITED STATES PATENT AND TRADEMARK OFFICE
CERTIFICATE OF CORRECTION

PATENT NO. : 8,783,948 B2
APPLICATION NO. : 13/142843
DATED : July 22, 2014
INVENTOR(S) : Panda et al.

Page 1 of 1

It is certified that error appears in the above-identified patent and that said Letters Patent is hereby corrected as shown below:

On the Title Page, in item (56), under "OTHER PUBLICATIONS", in Column 2, Line 1, delete "A.G. MacDiardmid," and insert -- A.G. MacDiarmid, --, therefor.

On Title Page 2, in item (56), under "FOREIGN PATENT DOCUMENTS", in Column 1, Line 2, delete "JP 2008130939 6/2008".

In the Specification

In Column 7, Line 35, delete "a m-cresol" and insert -- an m-cresol --, therefor.

In Column 8, Line 31, delete "2a Physical Appearance Test" and insert -- 2a) Physical Appearance Test, --, therefor.

In Column 9, Line 30, delete "6° C." and insert -- 60° C. --, therefor.

Signed and Sealed this
Twenty-third Day of December, 2014

Michelle K. Lee
*Deputy Director of the United States Patent and Trademark Office*